(12) United States Patent
Lawrenson et al.

(10) Patent No.: US 9,736,280 B2
(45) Date of Patent: Aug. 15, 2017

(54) APPARATUS AND METHOD FOR FACILITATING A USER GRASPING A HAND-HELD DEVICE

(71) Applicant: Telefonaktiebolaget L M Ericsson (publ), Stockholm (SE)

(72) Inventors: Matthew John Lawrenson, Bussigny (CH); Till Burkert, Huddinge (SE); Julian Charles Nolan, Pully (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/778,209

(22) PCT Filed: Dec. 8, 2014

(86) PCT No.: PCT/SE2014/051468
§ 371 (c)(1),
(2) Date: Sep. 18, 2015

(87) PCT Pub. No.: WO2016/093747
PCT Pub. Date: Jun. 16, 2016

(65) Prior Publication Data
US 2016/0352874 A1    Dec. 1, 2016

(51) Int. Cl.
*H04M 1/00* (2006.01)
*H04M 1/02* (2006.01)
*G06F 1/16* (2006.01)
*H04B 1/10* (2006.01)
*H04M 1/725* (2006.01)

(52) U.S. Cl.
CPC ........ *H04M 1/0202* (2013.01); *G06F 1/1626* (2013.01); *G06F 1/1666* (2013.01); *H04M 1/72519* (2013.01); *H04M 2250/12* (2013.01)

(58) Field of Classification Search
CPC ............ H04M 1/0202; H04M 2250/12; G06F 1/1626
USPC ....................................................... 455/575.1
See application file for complete search history.

(56) References Cited

U.S. PATENT DOCUMENTS

2007/0125636 A1    6/2007  Karan et al.
2015/0185781 A1*   7/2015  Yu ......................... G06F 1/1652
                                                    345/173

FOREIGN PATENT DOCUMENTS

EP       2288123 A2       2/2011
JP       S63272148        11/1988
WO       WO 204189665 A1  11/2014

OTHER PUBLICATIONS

PCT International Search Report re Patent Application No. PCT/SE2014/051468, dated stamped Aug. 21, 2015.

* cited by examiner

*Primary Examiner* — Lee Nguyen
(74) *Attorney, Agent, or Firm* — Baker Botts, LLP

(57) ABSTRACT

An apparatus that helps a user grasp a hand-held device (10) resting on an underlying surface (S) detects when the user is reaching for the hand-held device. In response to the detection, the apparatus performs an action that elevates at least a part of the hand-held device above the underlying surface. Elevating the hand-held device above the underlying surface allows the user to grasp and lift the hand-held device off of the underlying surface more easily.

34 Claims, 13 Drawing Sheets

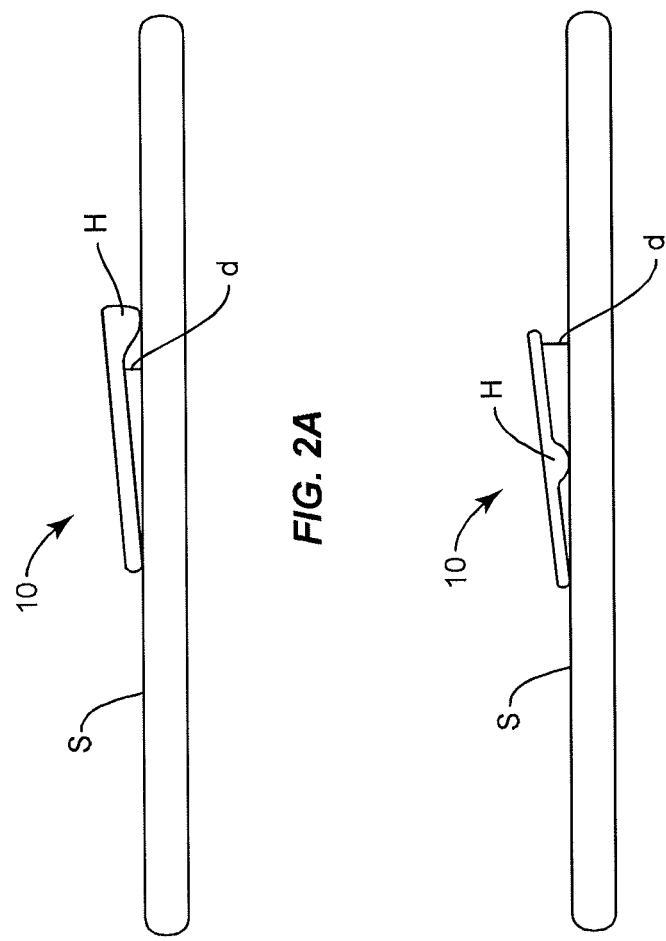

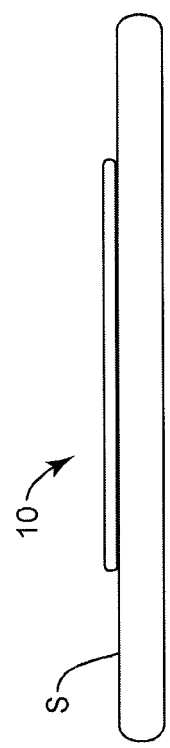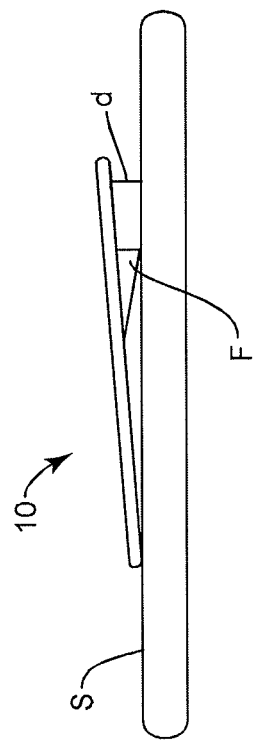

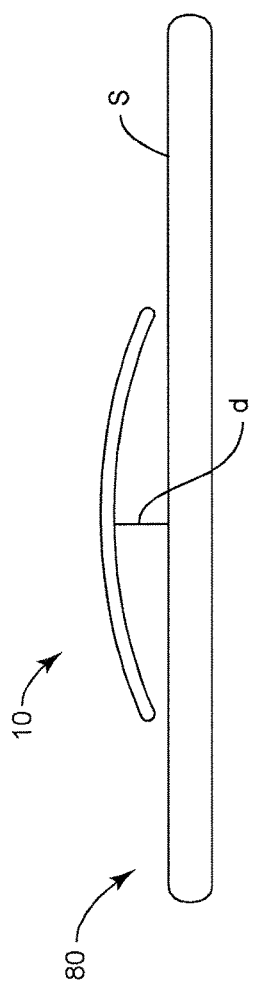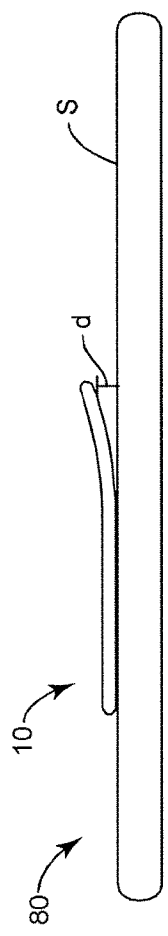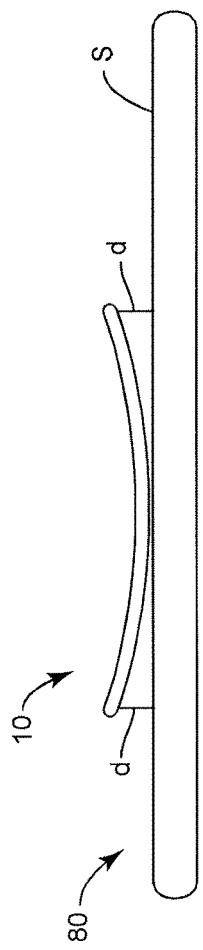

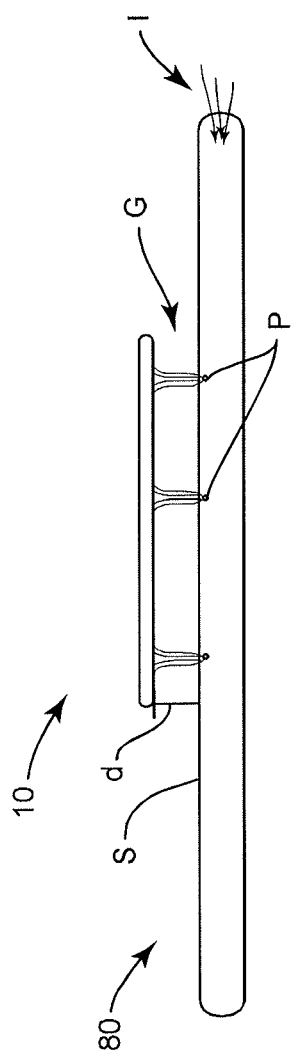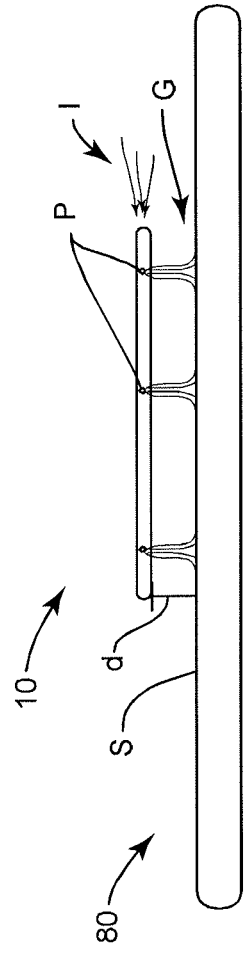
FIG. 12A
FIG. 12B

APPARATUS AND METHOD FOR FACILITATING A USER GRASPING A HAND-HELD DEVICE

PRIORITY

This nonprovisional application is a U.S. National Stage Filing under 35 U.S.C. §371 of International Patent Application Serial No. PCT/SE2014/051468, filed Dec. 8, 2014, and entitled "APPARATUS AND METHOD FOR FACILITATING A USER GRASPING A HAND-HELD DEVICE."

TECHNICAL FIELD

The present disclosure relates generally to consumer electronic devices, and more particularly, to hand-held consumer devices that are configured to be at least partially elevated above an underlying surface.

BACKGROUND

Modern day hand-held consumer devices, such as tablet computing devices and mobile devices (e.g., cellular telephones) have become thinner and thinner over the years. For example, consider the changes in the structure of a mobile phone. The best-selling mobile phone in the year 2000—the NOKIA 3310—had a thickness of about 22 mm. However, the best-selling mobile phone in 2013—the APPLE IPHONE 5S—was just 7.6 mm thick. The difference in thickness of the two devices is indeed remarkable.

Although such thin devices are generally desirable, they are also notoriously frustrating for a user to pick up from an underlying surface, such as that of a table or a charging mat, for example. Adding to this difficulty is the design of modern hand-held devices. Often, most hand-held devices are designed to have curved edges and are manufactured from smooth materials. However, while such features make these devices aesthetically pleasing, they also add to the user's frustration. Of course, increasing the thickness of such devices may help, but given consumers' current preferences towards smaller form factors for their hand-held devices, one can safely assume that the trend towards thinner devices is likely to continue.

SUMMARY

The present disclosure provides an apparatus and a corresponding method for facilitating a user grasping a hand-held device, such as a cellular telephone, for example, so that the user can more easily remove the hand-held device from the underlying surface.

In one embodiment, the present disclosure provides a method for enabling a user to grasp a hand-held device positioned on an underlying surface. In this embodiment, the method calls for detecting that a user is reaching for the hand-held device while the hand-held device is resting on the underlying surface. Responsive to the detecting, the method calls for elevating at least a part of the hand-held device above the underlying surface. Elevating the hand-held device comprises altering at least one of a shape of the hand-held device, and a vertical position of the hand-held device relative to the underlying surface, thereby facilitating the user grasping the hand-held device.

The underlying surface may comprise a surface of a peripheral device, such as a charging mat, associated with the hand-held device, or it may comprise the top surface of a table.

In one embodiment, detecting that the user is reaching for the hand-held device while the hand-held device is resting on the underlying surface comprises generating a pick-up signature based on signals received from one or more sensors indicating that the user's hand is approaching the hand-held device, and then comparing the pick-up signature to a predefined reference signature comprising information representing the user's hand approaching the hand-held device. If the pick-up signature matches at least one of the reference signatures, the method determines that the user is reaching for the hand-held device.

In some embodiments, the method calls for calculating a distance between the user's hand and the hand-held device as the user's hand approaches the hand-held device. When the calculated distance is less than or equal to a predetermined distance threshold, it is determined that the user is reaching for the hand-held device.

In one embodiment, the method further calls for activating a grip facilitation circuit in one or both of the hand-held device and the peripheral device responsive to receiving a signal indicating that the user is reaching for the hand-held device. In such cases, the grip facilitation circuit may alter one or both of the shape and the vertical position of the hand-held device.

In one embodiment, activating the grip facilitation circuit comprises controlling one of the hand-held device and the peripheral device to extend a retractable member that elevates at least a portion of the hand-held device vertically above the underlying surface when the retractable member contacts the underlying surface.

In another embodiment, activating the grip facilitation circuit comprises generating a magnetic field that elevates at least a portion of the hand-held device vertically above the underlying surface.

Activating the grip facilitation circuit in another embodiment comprises expelling a gas to elevate at least a portion of the hand-held device vertically above the underlying surface, while activating the grip facilitation circuit in another embodiment calls for altering the shape of the hand-held device such that at least a portion of the hand-held device is elevated above the underlying surface.

There are various ways in which the shape of the hand-held device can change. In one embodiment, for example, controlling the hand-held device to alter its shape calls for deforming the hand-held device such that a portion of the hand-held device is above the underlying surface, while one or both opposing ends of the hand-held device remain in contact with the underlying surface. Another way is to increase a volume of the portion of the hand-held device such that a part of the hand-held device is elevated above the underlying surface.

Additionally, in one embodiment, the method calls for deactivating the grip facilitation circuit responsive to a termination event. Such events may include, for example, detecting that the user has grasped the hand-held device, or detecting that a predetermined timer has expired without the user grasping the hand-held device, or detecting that the hand-held device and the peripheral device are no longer communicating with each other.

To prevent undesirable movement of the hand-held device, the method may also call for activating a stabilizer to stabilize the movement of the hand-held device while the vertical position of the hand-held device is changing.

In some embodiments, the method further calls for authenticating the user responsive to detecting that the user is reaching for the hand-held device resting on the underlying surface, and altering one or both of the shape and the vertical position of the hand-held device if the user is authenticated.

In some embodiments, the method further calls for determining a metric corresponding to one or both of a size and a shape of the user's hand responsive to detecting that the user is reaching for the hand-held device, and calculating a distance to elevate the hand-held device above the underlying surface based on the determined metric. Once calculated, the method calls for altering the one or both of the shape and the vertical position of the hand-held device according to the calculated distance.

Additionally, the present disclosure also provides an apparatus for facilitating a user grasping a hand-held device. In one embodiment, the apparatus comprises one or more sensors configured to detect a user's hand reaching for a hand-held device while the hand-held device is resting on an underlying surface, a grip facilitation circuit configured to alter at least one of a shape of the hand-held device, and a vertical position of the hand-held device relative to the underlying surface, and a processor communicatively connected to the one or more sensors and the grip facilitation circuit, and configured to activate the grip facilitation circuit responsive to receiving an indication from the one or more sensors that the user is reaching for the hand-held device to enable the user to grasp the hand-held device.

According to various embodiments of the present disclosure, the apparatus may be the hand-held device, or the apparatus may be a peripheral device, such as a charging mat, for example, that is used to charge the battery of the hand-held device.

Regardless of whether the apparatus is the hand-held device or the peripheral device, however, the processor is further configured in one embodiment to generate a pick-up signature based on signals received from the one or more sensors indicating that the user's hand is approaching the hand-held device, and compare the pick-up signature to a predefined reference signature comprising information representing the user's hand approaching the hand-held device. The processor is then configured to determine that the user is reaching for the hand-held device if the pick-up signature matches at least one of the reference signatures to within a predetermined threshold.

In one embodiment, the processor is further configured to calculate a distance between the user's hand and the hand-held device as the user's hand approaches the hand-held device, and determine that the user is reaching for the hand-held device when the calculated distance is less than or equal to a predetermined distance threshold.

In one embodiment, the grip facilitation circuit comprises a retractable member (F). In these embodiments, the processor is further configured to control the grip facilitation circuit to extend the retractable member to elevate at least a portion of the hand-held device vertically above the underlying surface.

In another embodiment, the processor is further configured to control the grip facilitation circuit to generate a magnetic field that elevates at least a portion of the hand-held device vertically above the underlying surface.

In other embodiments, the processor is further configured to control the grip facilitation circuit to expel a gas that elevates at least a portion of the hand-held device vertically above the underlying surface.

In some embodiments, the processor is further configured to control the grip facilitation circuit to alter the shape of the hand-held device such that at least a portion of the hand-held device is elevated vertically above the underlying surface.

For example, in these embodiments, the processor may be configured to control the grip facilitation circuit to deform the hand-held device such that the portion of the hand-held device is above the underlying surface while one or both opposing ends of the hand-held device remain in contact with the underlying surface. Additionally or alternatively, the processor may be further configured to control the grip facilitation circuit to increase a volume of the portion of the hand-held device such that a part of the hand-held device is above the underlying surface.

In addition to the above, the processor, in at least one embodiment, is further configured to deactivate the grip facilitation circuit responsive to detecting that the user has grasped the hand-held device, or that a predetermined timer has expired without the user grasping the hand-held device that the hand-held device and the peripheral device are no longer communicating with each other.

In one embodiment, the apparatus further comprises a stabilizer configured to stabilize movement of the hand-held device while the vertical position of the hand-held device is changing.

Additionally, the processor may be further configured to perform additional functions. In one embodiment, for example, the processor is further configured to authenticate the user responsive to detecting that the user is reaching for the hand-held device resting on the underlying surface, and then alter one or both of the shape and the vertical position of the hand-held device if the user is authenticated.

In another embodiment, the processor is further configured to determine a metric corresponding to one or both of a size and a shape of the user's hand based on one or more signals received from the proximity detector, calculate a distance to elevate the hand-held device above the underlying surface based on the determined metric, and then alter the one or both of the shape and the vertical position of the hand-held device according to the calculated distance.

In addition, the present disclosure also provides a computer-readable storage medium. The storage medium comprises a control application stored thereon that, when executed by a processor, controls the processor to detect that a user is reaching for a hand-held device while the hand-held device is resting on an underlying surface. In addition, responsive to the detecting, the control application controls the processor to elevate at least a part of the hand-held device above the underlying surface to enable the user to grasp the hand-held device. To elevate the hand-held device, the control application may control the processor to alter a shape of the hand-held device, or a vertical position of the hand-held device relative to the underlying surface.

In one embodiment, a method for enabling a user to grasp a hand-held device positioned on an underlying surface comprises detecting that a user is reaching for the hand-held device while the hand-held device is resting on the underlying surface, and responsive to the detecting, elevating at least a part of the hand-held device above the underlying surface to enable the user to grasp the hand-held device. The method may be implemented at and performed by the hand-held device, or a peripheral device associated with the hand-held device. In the latter cases, the underlying surface comprises a surface of the peripheral device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

FIGS. 2A-2B are side views of a hand-held device partially elevated above a surface of an underlying surface according to one embodiment of the present disclosure.

FIG. 3A is a side view of a hand-held device resting on an underlying surface according to an embodiment of the present disclosure.

FIG. 3B is a side view of a hand-held device partially elevated above an underlying surface according to an embodiment of the present disclosure.

FIGS. 11A-11C are side views showing at least a part of a hand-held device elevated above an underlying surface of a peripheral device, such as a charging mat, according to an embodiment of the present disclosure.

FIGS. 12A-12B are side views showing a hand-held device elevated above an underlying surface according to an embodiment of the present disclosure.

DETAILED DESCRIPTION

Structural designs for modern hand-held portable devices, such as cellular telephones and tablet computing devices, for example, has traditionally trended towards a form factor that is flat and thin. While aesthetically pleasing, such flat, thin structures have a disadvantage in that they make the device more difficult for a user to grasp. This is especially true when the hand-held device is resting on a flat, underlying surface, such as that of a table top or a charging mat, for example.

Conventionally, such devices are not adequately equipped with appropriate features that make it easier for a user to grasp. This is because such features tend to lessen the aesthetic appeal of the device, or in some cases, degrade the functionality of the hand-held device. For example, some conventional solutions configure hand-held devices to slide horizontally over an underlying surface on which it rests. However, these conventional "sliding" solutions are problematic because they risk damaging the device. Particularly, with these types of solutions, the device could fall over an edge of the surface on which it rests.

Other solutions place the hand-held device into a case or frame having an attached, fixed protrusion that extends between the hand-held device and the underlying surface. Such protrusions are generally sized and shaped to maintain at least a part of the case, and thus, the hand-held device, above the underlying surface. These protrusions are not retractable, however, making devices that have these features unnecessarily bulky and less attractive to consumers. Further, depending on the design of the hand-held device and/or the case, such protrusions could interfere with some of the functionality of the device. Embodiments of the present disclosure, however, address such issues by elevating at least a part of the hand-held device above a surface on which it rests, thereby making it easier for a user to grasp the hand-held device from the surface.

Figure 1:
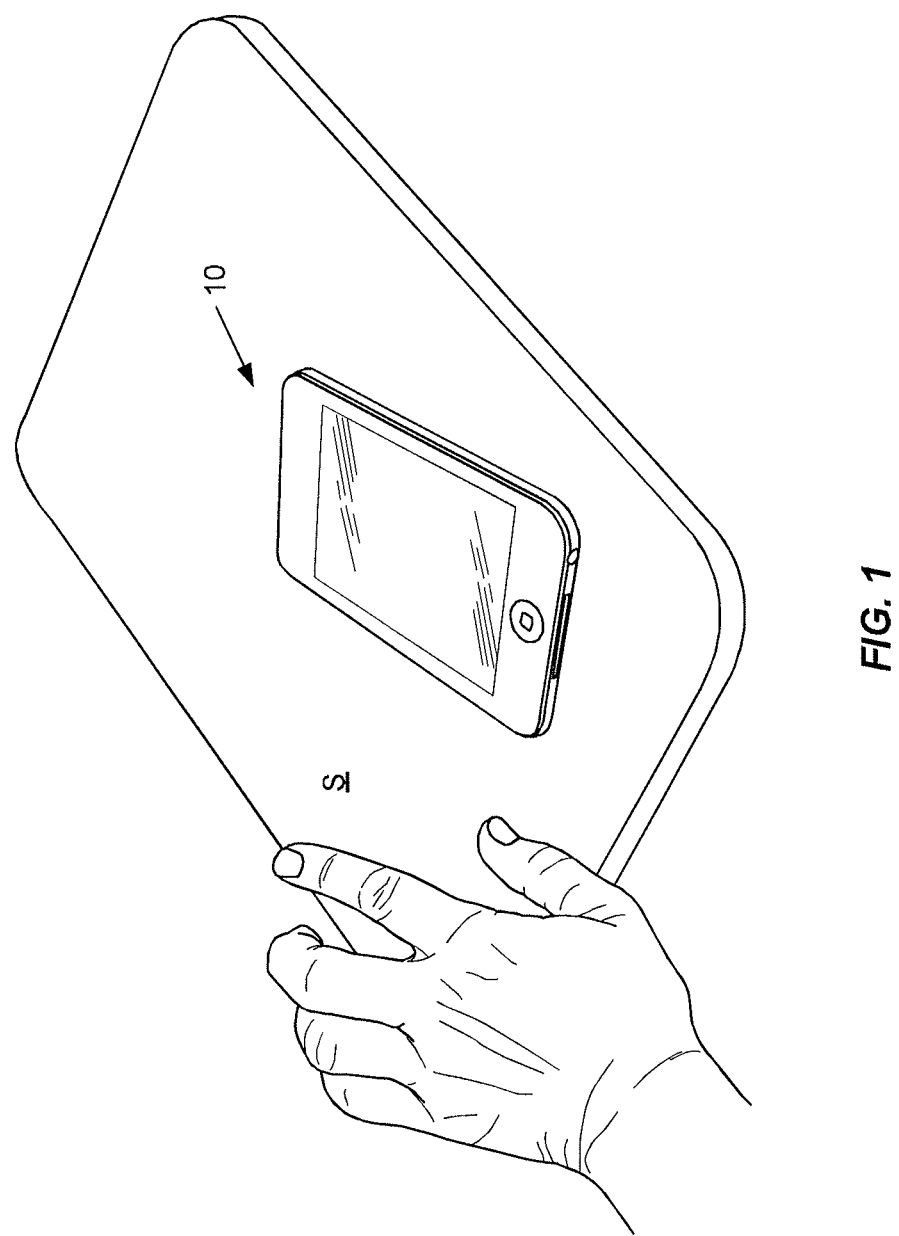
FIG. 1 is a perspective view of a hand-held device resting on an underlying surface according to one embodiment of the present disclosure.

Turning now to the drawings, FIG. 1 is a perspective view illustrating a hand-held device 10 resting on an underlying surface S. In this embodiment, hand-held device 10 is a cellular telephone, and the underlying surface S, which is generally flat, is the top surface of a table. However, those of ordinary skill in the art should appreciate that this is for illustrative purposes only. The hand-held device 10 may be any type of portable consumer electronic device, such as a tablet or notebook computer, for example. Additionally, as described in later embodiments, the underlying surface S may be the surface of a peripheral device for the hand-held device, such as a charging mat, for example, that inductively charges the battery of the hand-held device 10.

To elevate at least a part of the hand-held device 10 according to the present disclosure, some embodiments configure the hand-held device 10 to first determine whether a user is likely to imminently grasp the hand-held device 10 while it rests on underlying surface S. Responsive to making this determination, hand-held device 10 will then perform an action that makes it easier for the user to grasp the hand-held device 10 from the surface S. For example, some embodiments of the present disclosure configure hand-held device 10 to temporarily levitate all or a part of itself above the underlying surface S for a predetermined time. Other embodiments, however, configure hand-held device 10 to temporarily alter its shape so that at least a part of the hand-held device 10 becomes elevated above the underlying surface S. Regardless of the embodiment, however, elevating at least a part of the hand-held device 10 above the underlying surface S on which it rests enables a user to grasp the hand-held device more easily when picking the device up from the underlying surface.

Those skilled in the art should appreciate that the distance above which the hand-held device 10 must be elevated above the underlying surface S is small (e.g., a few millimeters). Further, the hand-held device 10 need only be elevated by that distance for a very short time (e.g., about 1 second or less). This will allow the hand-held device 10 to judiciously utilize its power resources while still placing itself in a better position to be grasped by the user.

FIGS. 2A-2B, for example, illustrate embodiments in which hand-held device 10 changes its shape to elevate at least a part of itself above surface S. Particularly, under normal conditions, the housing H of hand-held device 10 is generally smooth and flat, and thus, has its normal form factor. In these embodiments, however, a part of the housing H of hand-held device 10 is constructed from, or comprises, a "shape-changing" material able to temporarily change shape in response to some stimulus. The material, which may be one of the materials described below, changes its shape temporarily to lift a part of the hand-held device 10 above the underlying surface S while leaving other parts of the housing H in contact with the underlying surface S. For example, as seen in the embodiments of FIGS. 2A-2B, the material may be configured to temporarily increase in size thereby raising the part of the hand-held device 10 above the underlying surface S by a distance d.

There are various materials that may be used to construct the housing H of hand-held device 10 such that it temporarily changes its shape according to the present disclosure. One such material is commonly referred to as a shape memory alloy (SMA). Generally, SMAs are alloys that "remember" their original shapes. Thus, the parts of hand-held devices 10 constructed from an SMA can return to their original shape even after they have been deformed. There are many suitable materials for such SMAs, however, some of the more common alloys include, but are not limited to, copper-aluminum-nickel alloys and nickel-titanium alloys.

With some SMAs, heat will cause the SMA to return to its original shape. Other SMAs materials, however, will return to their original shape when cooled. With embodiments of the present disclosure, the SMAs can be selectively controlled by a processor in the hand-held device 10 whenever the processor detects that the user is reaching for hand-held device 10. Particularly, the processor may heat the part of the housing constructed from the SMA such that it temporarily deforms and elevated at least a part of the hand-held device 10 above the underlying surface S. Once the user has grasped the hand-held device 10, or after a predetermined time has expired, the SMA is cooled so that it returns to its original shape.

Another embodiment utilizes a frame of foam coated in wax for the structure of the hand-held device 10. With this embodiment, the foam frame is rigid when the wax coating is cool. This phase may be a "normal" phase in which the hand-held device 10 has its typical form factor. However, when the wax is heated, the wax becomes soft and pliable. In this phase, the foam frame is deformable into various shapes. The foam frame will remain in a deformed shape until the wax is cooled, in which case, the foam frame returns to its original shape.

In such embodiments, the wax may be heated, and thus deformed, by the processor in hand-held device 10 responsive to detecting that a user is reaching for the hand-held device 10. Once a predetermined time has elapsed, or once the processor has determined that the user has grasped hand-held device 10, the wax is permitted to cool such that the housing of the hand-held device 10 returns to its original shape.

Another embodiment of the present disclosure constructs the hand-held device 10 from a hydrogel. As is known in the art, hydrogels comprise a network of cross-linked polymer chains that are soft and flexible. Such materials may respond to various stimuli, such as temperature and electrical fields. Therefore, some embodiments of the present disclosure, a processor in the hand-held device 10 increases and decreases a temperature of the hydrogel material used in the construction of the housing of the hand-held device 10. Other embodiments, however, configure the processor in the hand-held device 10 to generate and collapse an electrical field that increases and decreases the hydrogel material of the housing H.

The hydrogel material may be disposed at selected areas of the housing of hand-held device 10. Thus, only those areas need to be controlled by changing the temperature of the material in that area as described. Further, once a predetermined time has elapsed, or once the hand-held device 10 has determined that the user has grasped the hand-held device 10, the processor can lower the temperature of the housing H, and/or cease to generate the electrical field, thereby allowing the hydrogel material to return to its original size and shape.

In another embodiment, the hand-held device 10 is constructed of an electroactive polymer (EAP). As is known in the art, EAPs may be stimulated by an electrical field. In the context of the present disclosure, an EAP may be disposed in a selected area of the hand-held device 10. When the processor in the hand-held device 10 determines that the user is reaching for hand-held device 10, it generates an electrical field that causes the EAP to expand. After a predetermined time, or upon detecting that the user has grasped the hand-held device 10, the electrical field generation is ceased thereby allowing the EAP to return to its original size and shape.

FIGS. 3A-3B illustrate another embodiment of the present disclosure in which hand-held device 10 temporarily changes its shape. Particularly, FIGS. 3A-3B are perspective side views illustrating an embodiment in which hand-held device 10 is configured to utilize a mechanical means to elevate at least a part of itself above the underlying surface S. Such embodiments are useful, for example, in cases where the hand-held device 10 rests on the surface of a table or other such object that cannot assist the user in grasping the hand-held device 10.

More particularly, as seen in FIG. 3A, the hand-held device 10 normally lies substantially flat on the underlying surface S. However, in response to determining that a user is reaching for the hand-held device 10, the processor within the hand-held device 10 generates a control signal that causes a member, such as foot F or similar extension, to extend outwardly from the housing of hand-held device 10. Alternatively, the foot F may be extended from a case into which the hand-held device 10 fits. Regardless of whether foot F is part of the hand-held device 10, however, the foot F is retractable. Thus, the foot F may be controlled to extend outwardly from the hand-held device 10 for a predetermined time to elevate at least a part of the hand-held device 10 a distance d above the underlying surface S. When the timer expires, or when it is determined that the user has grasped the hand-held device 10, the extendable foot F is retracted into the housing H (or into the case) such that it is once again substantially flush with the exterior of the housing H or casing. This allows a hand-held device 10 to facilitate the user's intended grasp while maintaining an aesthetically pleasing form factor.

Figure 4:
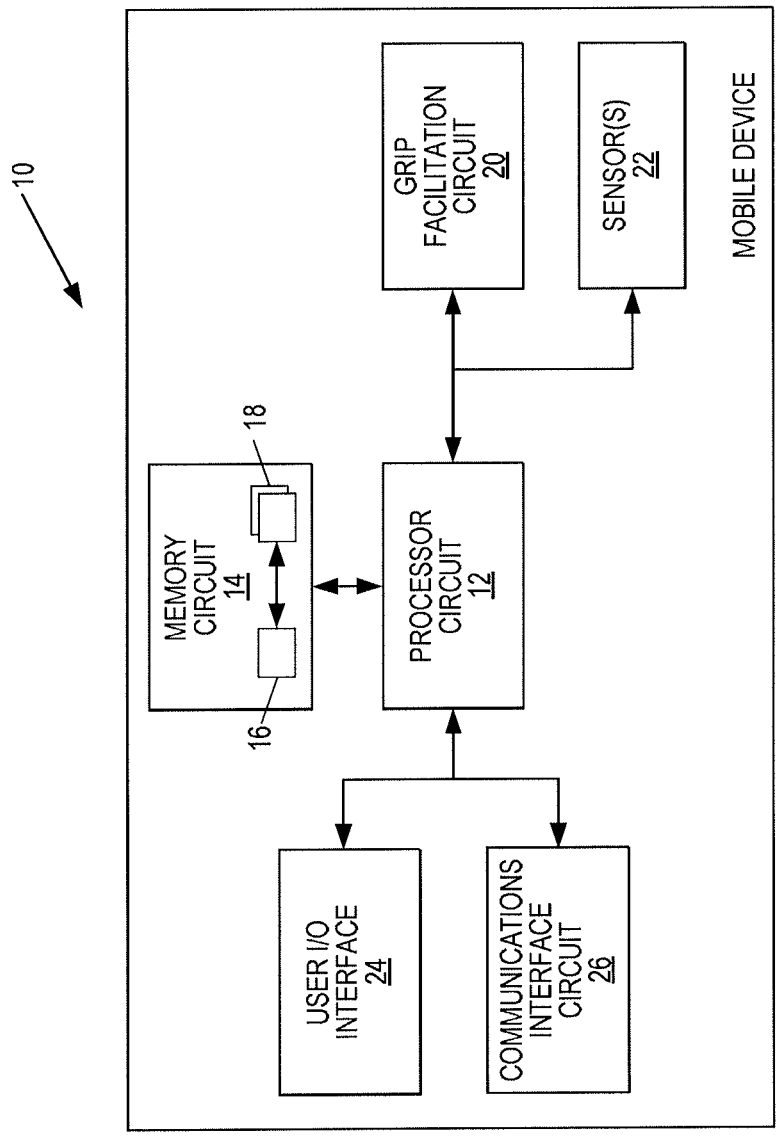
FIG. 4 is a functional block diagram illustrating some components of a hand-held device elevated according to an embodiment of the present disclosure.

FIG. 4 is a block diagram illustrating some of the functional components of a hand-held device 10 configured according to one embodiment of the present disclosure. As seen in FIG. 4, the hand-held device 10 comprises a processor circuit 12, a memory circuit 14, a grip facilitation circuit 20, one or more sensors 22, a user input/output (I/O) interface 24, and a communications interface circuit 26. As described with respect to FIG. 4, the hand-held device 10 is embodied as a cellular telephone, such as a smartphone, for example. However, as previously stated, this is for illustrative purposes only. The hand-held device 10 of the present disclosure may comprise other types of portable hand-held devices such as tablet and notebook computing devices.

Processor circuit 12, which may comprise one or more microprocessors, microcontrollers, hardware circuits, or a combination thereof, generally controls control the operation of the hand-held device 10. Configured according to one or more embodiments of the present disclosure, the processor circuit 12 receives and processes signals from the one or more sensors 22, and determines, based on those signals, whether the user is reaching for the hand-held device 10 while it is resting on the underlying surface S. As described later in more detail, the hand-held device 10 may, in some embodiments, lack such sensing capabilities. In these cases, processor circuit 12 may be able to make the determination responsive to information and/or control signals received from other devices. Regardless of the origin of the information on which the determination is made, however, processor circuit 12 is configured to generate signals to control the grip facilitation circuit 20 to elevate at least a part of the hand-held device 10 above the underlying surface S.

Memory circuit 14 stores the program code and data needed by the processor circuit 12 to operate as herein described. Memory circuit 14 may comprise any combination of volatile and non-volatile memory devices, and may include discrete memory devices as well as internal memory. Program code executed by the processor circuit 12 is typically stored in a non-volatile memory such as a read-only memory (ROM) or flash memory, while temporary data generated during operation of the hand-held device 10 may be stored in a volatile memory, such as a random access memory (RAM).

In one embodiment of the present disclosure, memory circuit 14 stores a control application 16, which comprises the instructions and code for controlling the operation of hand-held device 10, and one or more profiles 18. Each profile 18 comprises an "electronic signature," i.e., characteristic sensor data that represents the user's hand reaching for the hand-held device 10 as it rests on the underlying surface S. For example, the signature in each profile 18 may represent the user's hand as it would appear approaching the hand-held device 10 from a different angle and/or distance from the hand-held device 10, and further, may be predetermined and provisioned into memory 14 or learned over time and stored in memory 14. In some embodiments, the profiles 18 are pre-provisioned in memory 14 by a manufacturer, for example, but may be thereafter updated by processor circuit 12 over time. This allows the processor circuit 12 to "learn" new signatures for a given user, as well as to further customize existing signatures for the given user.

The electronic signatures stored in profiles 18 may be generated using any method known in the art. For example, in one embodiment of the present disclosure, at least one of the sensors 22 comprises a camera configured to capture images of the user's hand as it approaches the hand-held device 10 resting on the underlying surface S. Using image analysis techniques that are well-known in the art, the processor circuit 12 analyzes the captured images and generates the electronic signature data that is then stored as a profile 18. Thereafter, as described in more detail below, the processor circuit 12 may utilize these profiles 18 to determine whether the user is about to grasp the hand-held device 10 from the underlying surface S.

The grip facilitation circuit 20 comprises circuitry and other hardware controlled by the processor circuit 12 to elevate at least a part of the hand-held device 10 above the underlying surface S. More specifically, the grip facilitation circuit 20 may comprise the circuits and/or associated hardware elements necessary for altering the shape of the housing H, or for extending the foot F from the housing H of hand-held device 10, as previously described. As described later in more detail, the grip facilitation circuit 20 in some embodiments of the present disclosure comprises a coil for generating a magnetic field that levitates at least a part of the hand-held device 10 above the underlying surface S.

The sensors 22 detect changes in a measured level of light and/or motion, and send those signals to the processor circuit 12 for analysis. In some embodiments, the processor circuit 12 may measure the size and shape of the user's hand that is reaching for the hand-held device 10 based on the signals received from the sensors 22, and capture images of the user who is grasping for the hand-held device 10 for use in authenticating the user. In one embodiment, the sensors 22 further comprise a plurality of touch-sensitive sensors distributed across the housing of hand-held device 10. The touch-sensitive sensors may be utilized, as described in more detail below, to determine whether a user has actually grasped the hand-held device 10.

The user I/O interface 24 and the communications interface circuit 26 comprise components whose functions are well-known in the art. Particularly, the user I/O interface 24 comprises the components necessary for the user to interact and control the operation of hand-held device 10. By way of example, the user I/O interface 24 may comprise such well-known components as a display, a keypad, a microphone and speaker, and various other controls and buttons as is known in the art. The communications interface circuit 26 comprises a receiver and transmitter interface for communicating with one or more other remotely located devices over a communications network. The communications interface circuit 26 may effect such communications using one or more communication protocols known in the art or that may be developed, such as IMS/SIP, Diameter, HTTP, RTP, RTCP, HTTPs, SRTP, CAP, DCCP, Ethernet, TCP/IP, SONET, ATM, or the like. The communication interface circuit 26 implements receiver and transmitter functionality appropriate to communication network links (e.g., optical, electrical, and the like), and the transmitter and receiver functions may share circuit components and/or software, or alternatively may be implemented separately.

In embodiments where the hand-held device 10 is a cellular telephone, the communications interface circuit 26 comprises a radio transceiver configured to communicate with remote parties and devices via a wireless communications network, such as a mobile communications network. For example, the communications interface circuit 26 may be configured to communicate across an air interface with at least one node of a radio access network, such as a base station (BS), utilizing any well-known protocol or that may be developed. Some exemplary protocols include, but are not limited to, IEEE 802.xx, CDMA, WCDMA, GSM, EDGE, LTE, UTRAN, E-UTRAN, WiMax, and the like.

Figure 5:
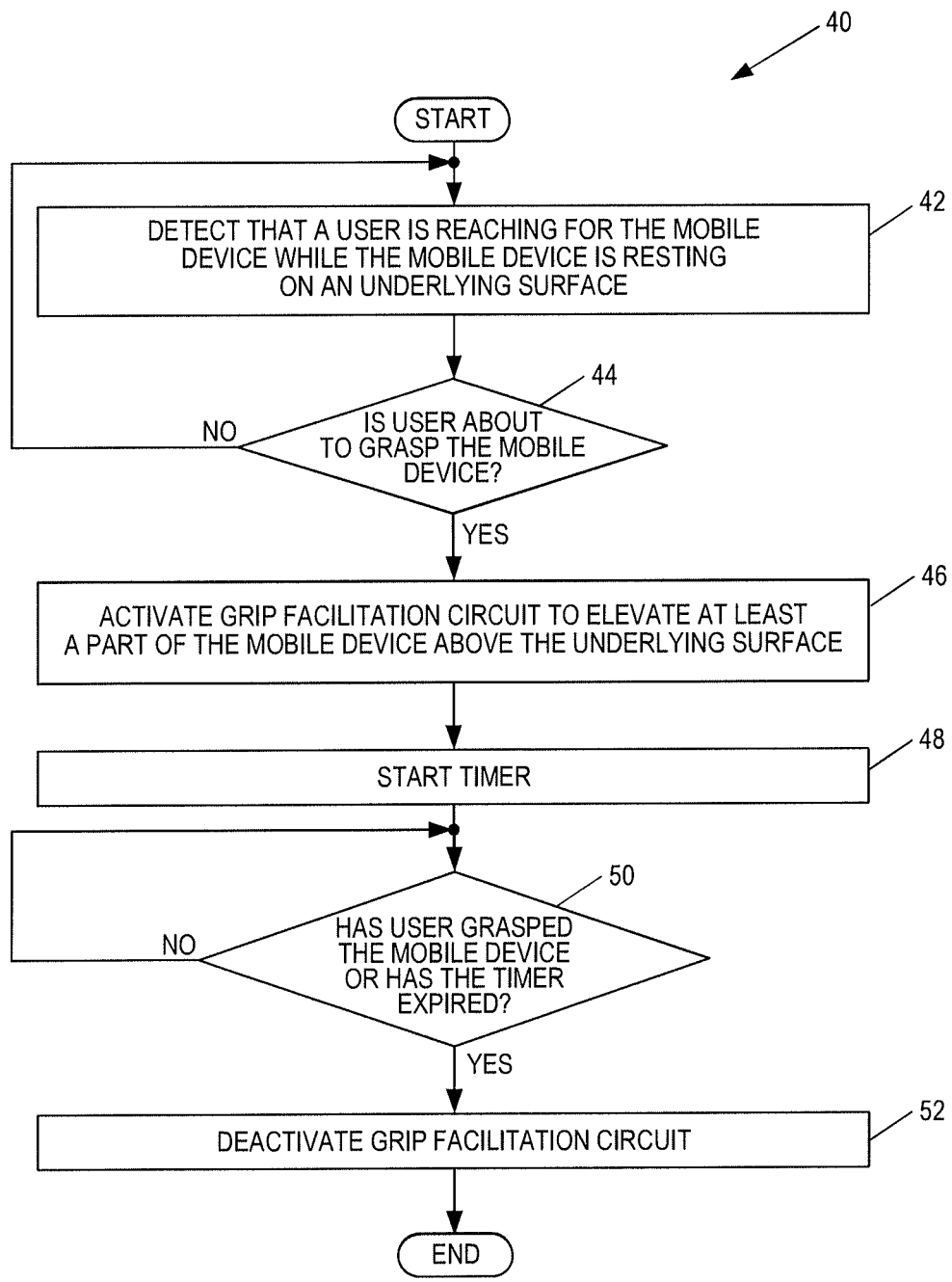
FIG. 5 is a flow diagram illustrating a method for elevating at least a part of a hand-held device above an underlying surface according to one embodiment of the present disclosure.

FIG. 5 is a flow diagram illustrating a method 40 for elevating at least part of the hand-held device 10 above the underlying surface S according to embodiments of the present disclosure. In this embodiment, the hand-held device 10 comprises a cellular telephone at rest on the surface S of a table top. However, this is for illustrative purposes only. As seen in more detail later, embodiments of the present disclosure are not so limited.

Method 40 begins when hand-held device 10 detects that a user is reaching to grasp the hand-held device 10 from the underlying surface 10 (box 42). For example, one or more of the sensors 22 may comprise a camera that captures one or more images of the user's hand as it approaches the hand-held device 10, for example, which are then sent to the processor circuit 12 for image analysis. Alternatively, or additionally, one or more of the sensors 22 may generate and send signals to processor circuit 12 indicating when the user's hand is approaching the hand-held device 10. In another embodiment, the processor circuit 12 may detect the presence of a signal from a device that is worn by the user. By way of example, the user may wear a smartwatch that transmits a signal. Typically, the strength of this signal, which is measured by the processor circuit 12, is very weak. However, as the user's hand nears the hand-held device 10, the signal strength increases. The processor circuit 12 could therefore determine that the user's hand is reaching for the hand-held device 10 if it detects that the signal strength is at or above a predetermined threshold. For these embodiments, the hand-held device 10 would further comprise, as is seen in later figures, circuitry that is able to receive such transmitted signals, such as a short-range receiver (e.g., BLUETOOTH).

Regardless of how processor circuit 12 receives the images and/or signals, processor circuit 12 will analyze the images and/or signals to determine whether the user will imminently grasp the hand-held device 10 (box 44). If, based on the received information, processor circuit 12 determines that the user's hand is not reaching for the hand-held device 10, method 40 returns to waiting for the one or more sensors 22 to detect such movement of the user's hand.

It is expected that performing the functions required for elevating at least a part of the hand-held device 10 above the underlying surface S will draw on the precious power resources of the hand-held device 10. Therefore, in one embodiment, processor circuit 12 is configured to elevate at least a part of the hand-held device 10 only temporarily. More specifically, processor circuit 12 may start an internal timer (box 46), and then activate the grip facilitation circuit 20 (box 48) to elevate all or a part of the hand-held device 10 above the underlying surface S. The timer may run for only a predetermined time (e.g., <1 second), thereby limiting the amount of time the hand-held device 10 is above the underlying surface S.

By way of example, processor circuit 12 may control the grip facilitation circuit 20 to drive an electrical current to heat a predetermined part of the housing H having the shape-changing material for a predetermined time. Alternatively, the processor circuit 12 may control the grip facilitation circuit 20 to extend the foot F beyond the flush surface of the housing H for the predetermined time. Regardless, of the particular embodiment, however, the processor circuit 12 will start a timer (box 48) to limit the amount of time that the grip facilitation circuit 20 is activated. The processor circuit 12 then checks to determine whether the timer has expired, or whether the user has grasped the hand-held device 10, as indicated, for example, by a plurality of touch-sensitive sensors 22 distributed across the housing H of the hand-held device 10 (box 50) that will indicate to the processor circuit 12 when the user is grasping the hand-held device 10. When either of these events occurs, the processor circuit 12 deactivates the grip facilitation circuit (box 52).

The embodiment of FIG. 5 utilizes both a timer and the sensing capabilities of the hand-held device to control when the grip facilitation circuit is deactivated. However, the present disclosure is not so limited. It should be noted that some embodiments of the present disclosure do not require the use of a timer to control the activation/deactivation of the grip facilitation circuit 20. Rather, in one embodiment, the hand-held device 10 utilizes the signals returned from the plurality of touch-sensitive sensors 22 distributed across the housing H. Particularly, when the user grasps the hand-held device 10, the touch-sensitive sensors 22 signal processor circuit 12, which then deactivates the grip facilitation circuit 20 in response. Similarly, the use of such touch-sensitive sensors is not required as some embodiments of the present disclosure will rely simply on the timer to limit the amount of time that the grip facilitation circuit is activated.

Figure 6:
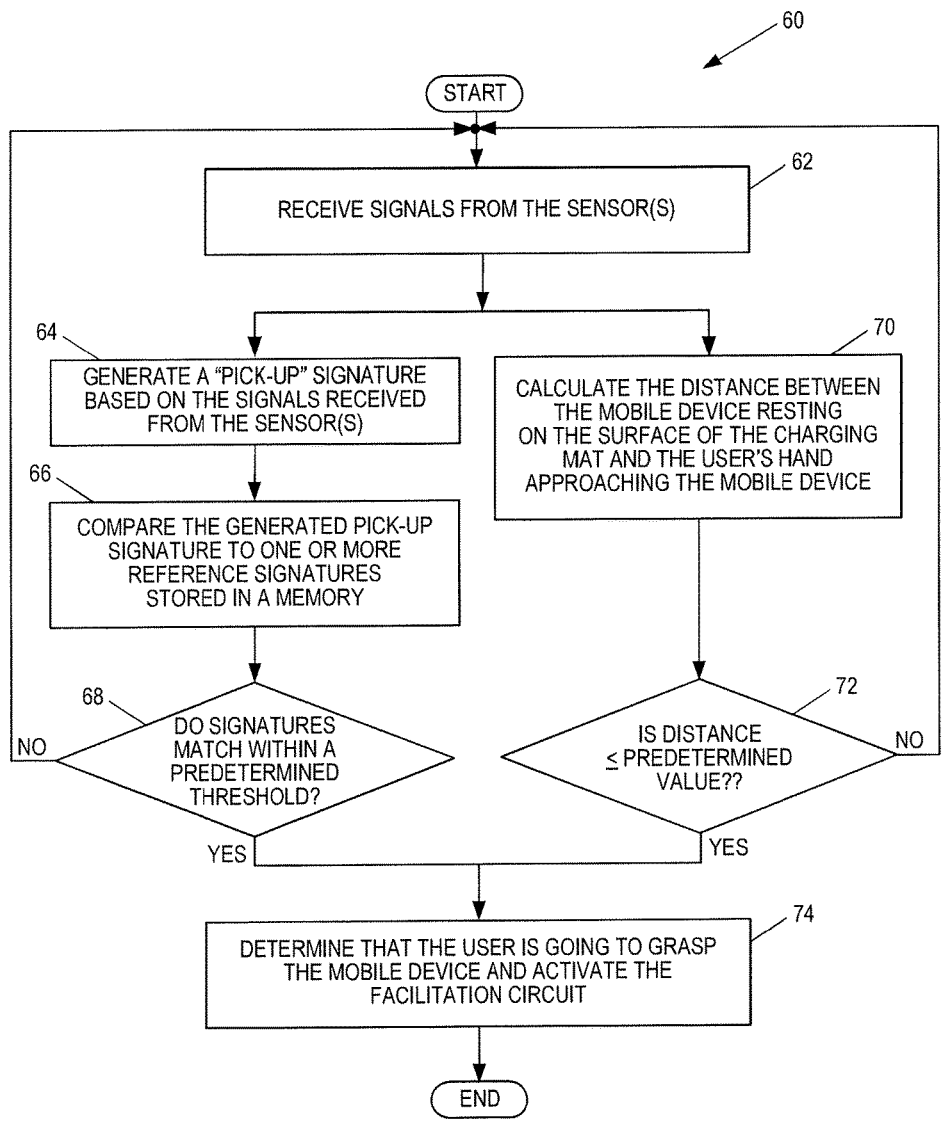
FIG. 6 is a flow diagram illustrating example methods for determining whether a user's hand is approaching a hand-held device resting on an underlying surface according to one embodiment of the present disclosure.

FIG. 6 is a flow diagram illustrating a method 60 performed by processor circuit 12 to determine whether a user that is reaching for the hand-held device 10 actually intends to grasp the hand-held device 10 according to embodiments of the present disclosure. Method 60 begins when processor circuit 12 receives signals from the one or more sensors 22 indicating that the user is reaching for the hand-held device 10 (box 62). Thereafter, the signals may be processed according to various embodiments. In one embodiment, for example, processor circuit 12 generates a "pick-up" signature based on those signals using any of a variety of well-known analysis techniques (box 64). For example, a camera on the hand-held device 10 may capture one or more images of the user's hand as the user's hand approaches the hand-held device 10. Processor circuit 12 analyzes those images to determine data points associated with the user's hand in the images, and then generates the pick-up signature from those data points. The resultant "pick-up" signature is then compared to one or more other reference signatures stored in the profiles 18 (box 66). If the generated pick-up signature matches at least one reference signature, either entirely or to within a predetermined threshold (e.g., 75% of the data points in both signatures match) (box 68), processor circuit 12 can determine with relative certainty that the user is going to grasp the hand-held device 10, and thus, activate the grip facilitation circuit 20 to elevate at least a part of the hand-held device 10 vertically above the underlying surface S (box 74).

It should be noted that the present disclosure is not limited to determining whether the user intends to grasp the hand-held device 10 based on whether the signatures match. In another embodiment, the hand-held device 10 is configured to extrapolate data from the captured images that indicates whether the user's hand is getting closer to the hand-held device 10 while it rests on the underlying surface S. In this embodiment, processor circuit 12 receives a series of images captured in succession by sensors 22 (e.g., a camera) (box 62). However, rather than generate and compare electronic signatures to stored reference signatures, processor circuit 12 in this embodiment mathematically analyzes the series of images and calculates, for each image, a distance between the user's hand and the hand-held device 10 based on that analysis (box 70). The distances, which indicate how close the user's hand is to the hand-held device 10, are then compared to a predefined distance threshold. When the comparison reveals a calculated distance that is less than or equal to the predefined distance threshold (box 72), processor circuit 12 determines that the user is reaching to pick-up the hand-held device 10 from the underlying surface S (box 74). Processor circuit 12 may then activate the grip facilitation circuit 20 to elevate at least a part of the hand-held device 10 above the underlying surface S, as previously described.

Those of ordinary skill in the art will appreciate that the present disclosure need not utilize a camera to perform method 60. In other embodiments, for example, the processor circuit 12 utilizes signals received from other devices, such as the user's smartwatch, for example, to determine when the user is reaching to grasp the hand-held device 10. In such embodiments, the processor circuit could simply measure the strength of the received signal transmitted by the smartwatch, and activate the grip facilitation circuit 20 for a predetermined time upon detecting that the signal strength is at or above a predetermined signal strength level.

The previous embodiments illustrate the hand-held device 10 performing the actions required to elevate at least a part of itself above an underlying surface S. However, the present disclosure is not limited to embodiments in which only the hand-held device 10 can perform these functions. For example, there are other embodiments in which the hand-held device 10 cooperates with, controls, or is controlled by, another device to achieve at least partial elevation.

The present disclosure may utilize any of a variety of principles to achieve such elevation of the hand-held device 10 in these embodiments. For example, some embodiments of the present disclosure utilize electromagnetism to temporarily lift all or a part of the hand-held device 10 above the underlying surface S of a peripheral device for the hand-held device 10. In these cases, the hand-held device 10 and the peripheral device each comprise a respective coil. When an electric current is passed through the coils, a magnetic field is generated that temporarily levitates all or a part of the hand-held device 10 above the underlying surface S. The magnetic field disappears when the current is turned off. Thus, by controlling the flow of current through coils, the present disclosure can control the magnetic fields and selectively elevate all or a part of the hand-held device 10 above the surface of the peripheral device.

Figure 7:
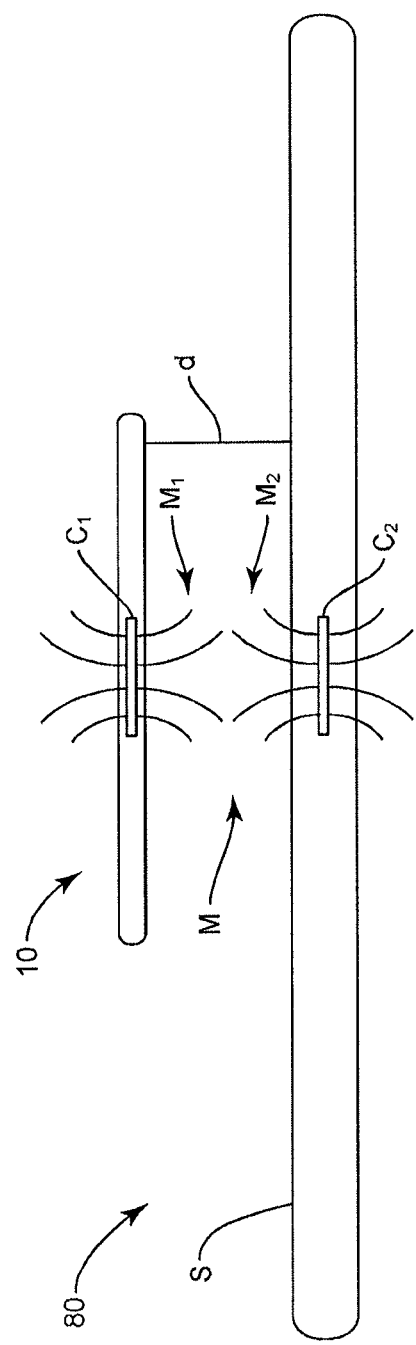
FIG. 7 is a side view of a hand-held device elevated above an underlying surface of a peripheral device, such as a charging mat, according to an embodiment of the present disclosure.

This particular principle is particularly beneficial when the peripheral device is a charging mat 80, as seen in FIG. 7. Particularly, the present disclosure utilizes the inductive charging or wireless charging to levitate all or a part of the hand-held device 10 above the underlying surface S of the mat 80. As is known in the art, wireless charging uses an electromagnetic field to transfer energy from one object to another. Thus, the battery of the hand-held device 10 may be inductively charged by the charging mat 80 that is coupled to the hand-held device 10 by an electromagnetic field. In such embodiments, an Alternating Current (AC) electromagnetic field is created in an induction coil disposed in the charging mat (e.g., coil $C_2$) that is then inductively coupled to a corresponding induction coil (e.g., coil $C_1$) disposed in the hand-held device 10. The resultant electromagnetic field induces a current in the induction coil in the hand-held device 10 that is then used to charge a battery.

One particular form of inductive coupling used with embodiments of the present disclosure is known as resonant inductive coupling. With resonant inductive coupling, both induction coils have a capacitive load, thereby forming corresponding first and second inductor-capacitor (LC) circuits. When each of the two LC circuits is tuned to resonate at the same frequency, power can be transmitted over a longer range than loosely coupled inductors alone. In these embodiments, the LC circuits are controlled to generate respective magnetic fields that elevate at least a part of the hand-held device 10 above the underlying surface S.

In another embodiment of the present disclosure, magnetic levitation is used to lift all or part of the hand-held device 10 above the underlying surface S of a peripheral device. In these embodiments, both the hand-held device 10 and the peripheral device comprise a combination of electromagnets and permanent magnets. Some of the magnets are controlled to counteract the effects of gravity and levitate all or a part of the hand-held device 10 above the underlying surface S, while other magnets, as seen in more detail later, are controlled to stabilize the hand-held device 10 during such levitation by reducing or substantially eliminating unwanted or undesirable movement of the hand-held device 10 relative to the underlying surface S. Such unwanted movement includes, but is not limited to, horizontal movement of the hand-held device 10, as well as any rotational movement of the hand-held device 10 relative to the underlying surface S.

FIG. 7 illustrates an embodiment that generates such a magnetic field M to elevate at least a part of the hand-held device 10 vertically above the underlying surface S of a charging mat 80. As seen in FIG. 7, both of the hand-held device 10 and the charging mat 80 comprise a respective coil $C_1$, $C_2$, through which respective currents are controlled to flow. Using any of the principles mentioned above, the currents cause each coil $C_1$, $C_2$ to generate a corresponding magnetic field $M_1$, $M_2$. In this case, the magnetic fields $M_1$, $M_2$ are generated so as to repel each other thereby levitating the hand-held device 10 above the underlying surface S by a vertical distance d. The vertical distance d in this embodiment is a distance that is determined by the amounts of current used to create the magnetic fields $M_1$, $M_2$. However, as described in more detail below, the distance d need not be tied to such predefined amounts of current. In some embodiments, the distance d is variable and calculated as a function of the size and shape of the user's hand that is reaching for the hand-held device 10. Thus, only the amount of current required to levitate the hand-held device 10 to a satisfactory distance d is provided to the coils $C_1$, $C_2$, thereby judiciously utilizing available power resources.

Those of ordinary skill in the art should appreciate that the present disclosure does not require both the hand-held device 10 and the charging mat 80 to comprise a coil, such as seen in FIG. 7. More specifically, generating a magnetic field in the hand-held device 10, if only temporarily, may still require a fairly sizable current. Therefore, in some embodiments, only the charging mat 80 comprises a coil, while the hand-held device 10 comprises a magnet in place of a coil. In these situations, only the charging mat 80 would be controlled to generate a magnetic field. As the charging mat 80 is connected to an external power source, generating such a current is limited by scarce battery resources. The magnet, however, would generate a magnetic field without the need for an external current. Eliminating the need for that current in the hand-held device 10 only further saves battery power.

Figure 8:
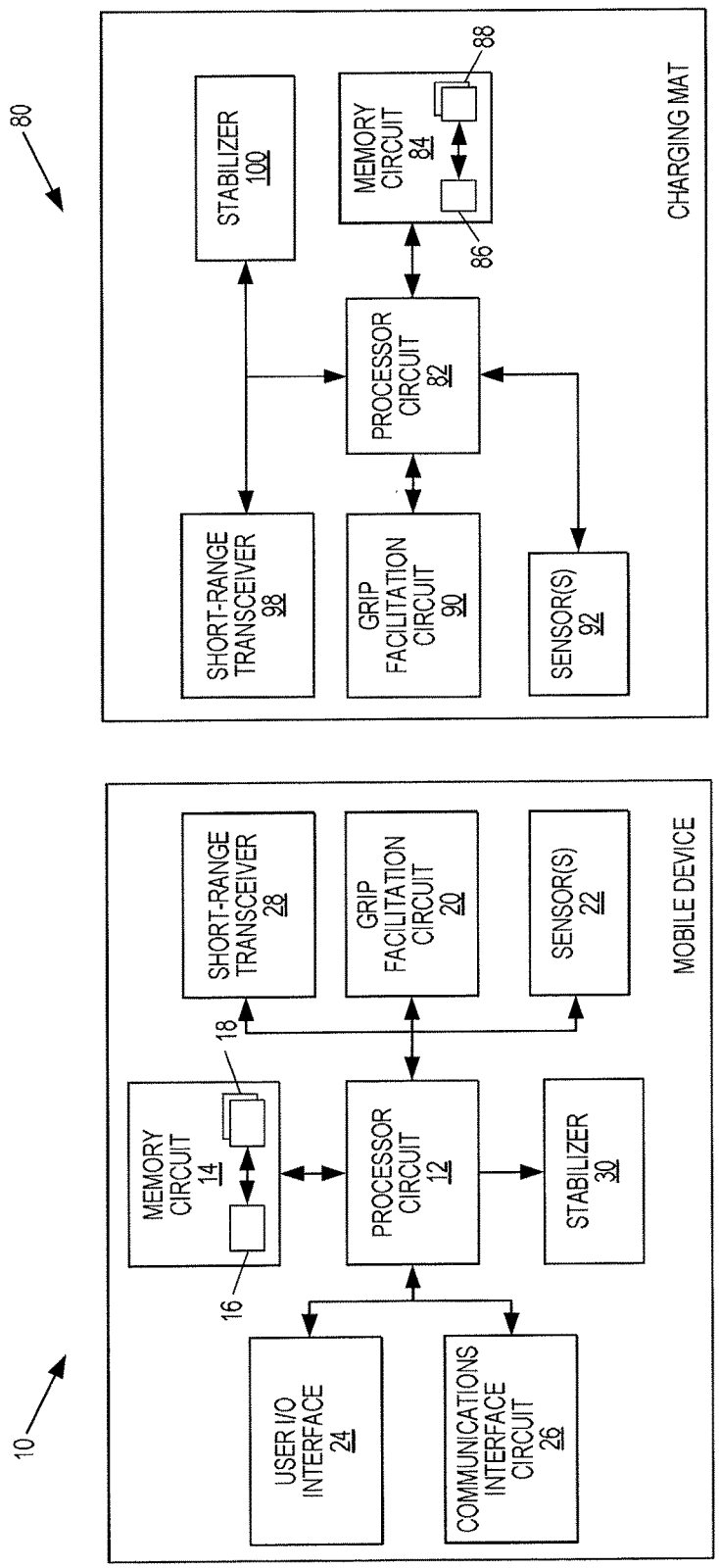
FIG. 8 is a functional block diagram illustrating some components of a hand-held device and a peripheral device, such as a charging mat, configured according to one embodiment of the present disclosure.

FIG. 8 illustrates some of the component parts of a hand-held device 10 and a charging mat 80 configured to function according to the embodiment of FIG. 7. Particularly, the hand-held device 10 and the charging mat 80 operate together to make it easier for the user to grasp the hand-held device 10. As seen in FIG. 8, the hand-held device 10 comprises the same components as previously described. Those components are therefore not discussed in detail further. However, it should be noted that in this embodiment, hand-held device 10 additionally comprises a short-range transceiver 28 and a stabilizer 30.

The short-range transceiver 28 may comprise any transceiver known in the art capable of transmitting and receiving data and signals with a corresponding short-range transceiver 98 disposed in the charging mat 80. Some suitable short-range transceivers include, but are not limited to, BLUETOOTH transceivers, Near Field Communication (NFC) transceivers, and InfraRed (IR) transceivers. Each of these transceivers communicates data and signals using respective protocols that are well-known and well-understood in the art. Therefore, no further discussion is contained herein with respect to their particular methods of communication. It is enough to say, however, that the short-range transceiver 28 may be controlled to pair or otherwise establish a communications link with the short-range transceiver 98 in the charging mat 80 such that the two devices may communicate signals and/or data regarding whether the user is about to grasp the hand-held device 10, and further, to control the hand-held device 10 and the charging mat 80 to elevate at least a part of the hand-held device 10 above the underlying surface S of the charging mat 80. Additionally, the short-range transceiver 28 may be configured to receive signals transmitted by a smartwatch or other device worn by the user, as previously described.

The stabilizer 30, under the control of processor circuit 12, helps to reduce or substantially eliminate any unwanted or undesirable movement of the hand-held device 10 relative to the underlying surface S while elevated above the underlying surface S. For example, when elevated above the underlying surface S, the hand-held device 10 may tend to slide horizontally across the underlying surface S, and/or rotate or twist. In these cases, the unwanted movement could cause the hand-held device 10 to become damaged. Therefore, to address these types of unwanted motion, the stabilizer 30 comprises components that function to counteract these motions.

By way of example only, the stabilizer 30 may comprise one or more electromagnetic magnets. The electromagnetic magnets may be controlled by processor circuit 12 responsive to determining that the user is reaching for the hand-held device 10 to pick the device up off of the underlying surface S. Thus, in a manner similar to that stated above for controlling the grip facilitation circuit, the processor circuit 12 may control a current to flow through the electromagnets of the stabilizer 30. The resultant magnetic fields would function to substantially reduce or prevent the hand-held device 10 from moving horizontally and/or rotationally, while still allowing the elevation of at least part of the hand-held device 10.

In another embodiment, stabilizer 30 comprises permanent magnets. In this embodiment, the permanent magnets are placed in fixed positions on selected areas of the charging mat 80. The areas are selected such that the resultant magnetic fields would substantially reduce or prevent any horizontal and/or rotational movement of the hand-held device 10, while still allowing for the elevation of at least part of the hand-held device 10.

Those of ordinary skill in the art will appreciate that the use of electromagnets or permanent magnets for stabilizer 30 is but one possible embodiment. Other embodiments of the present disclosure utilize a combination of electromagnets and permanent magnets. Further, as those of ordinary skill in the art should appreciate, the use of any type of magnet for stabilizer 30 is for illustrative purposes only. Other methods for stabilizing the hand-held device 10 while it is raised above the underlying surface S may be employed as needed or desired.

Regarding the charging mat 80, it generally functions to charge the battery of the hand-held device 10 whenever the user places the hand-held device on its surface S. In some embodiments, however, the charging mat 80 may also comprise the components necessary to perform at least some of the functions of the hand-held device 10 with respect to elevating that device above the surface S of the charging mat 80. By way of example only, the hand-held device 10 may not be configured, or able, to detect when the user is reaching for the device 10. Therefore, the charging mat 80 could perform this function and communicate information to the hand-held device 10.

Accordingly, the charging mat 80 may comprise a processor circuit 82, a memory circuit 84, a grip facilitation circuit 90, one or more sensors 92, a short-range transceiver 98, and a stabilizer 100. Processor circuit 82 also comprises circuitry such as one or more microprocessors, microcontrollers, hardware circuits, or a combination thereof, and generally controls the operations and functions of the charging mat 80 according to one or more embodiments of the present disclosure. For example, processor circuit 82 may comprise circuitry configured to activate and deactivate a charging function to charge the battery of the hand-held device 10, as well as execute instructions and code stored in memory 84, such as that of control application 86, to perform the functions described herein. As above, the memory circuit 84 and the processor circuit 82 may comprise separate components that communicate with each other via a bus, for example, or they may be incorporated as a unitary module or circuit.

In one or more embodiments of the present disclosure, the processor circuit 82 receives and processes signals from the one or more sensors 92. Based on those signals the processor circuit 82 determines whether the user is reaching for the hand-held device 10 while it is resting on the charging surface of the charging mat 80. In some embodiments, as previously described, the hand-held device 10 may not incorporate its sensors 22, and therefore, must rely on the sensing capabilities of the charging mat 80. In these cases, the processor circuit 82 is configured to make the determination based on the signals received from sensors 92, and then provide an indication to the hand-held device 10 via the short-range transceiver 98 that the user is reaching to grasp the hand-held device 10. Alternatively, processor 82 is configured to send the data reported by the sensors 92 to the hand-held device 12 via the short-range transceiver 98 so that processor circuit 12 in hand-held device 10 can make its own determination based on the received data. Regardless of how the determination is made, however, processor circuit 82 is configured to generate the control signals that control the grip facilitation circuit 90 to elevate at least a part of the hand-held device 10 above the underlying surface S. Additionally, like processor circuit 12, the processor circuit 82 may also measure the size and shape of the user's hand that is reaching for the hand-held device 10 based on the signals received from the sensors 92, and capture images of the user who is grasping for the hand-held device 10 for use in authenticating the user.

The functions of the memory circuit 84, short-range transceiver 98, sensors 92, grip facilitation circuit 90, and the stabilizer 100 are similar to those functions described above with respect to the hand-held device 10. Thus, the memory circuit 84, which may comprise any combination of volatile and non-volatile memory devices, and may include discrete memory devices as well as internal memory, also has the capability for storing a control application 86 and one or more profiles 88. As described above, the control application 86 controls the functions of the charging mat 80 for elevating the hand-held device 10 above the underlying surface S. Further, the profiles 88 may also contain "electronic signatures" or other data representing the user's hand reaching for the hand-held device 10 resting on the underlying surface S.

The short-range transceiver 98 may comprise a BLUETOOTH transceiver, an NFC transceiver, or an IR transceiver, for example, that establishes communication links with the hand-held device 10 in some embodiments. So established, the hand-held device 10 and the charging mat 80 can communicate information and data with each other, and elevate the hand-held device 10 above the underlying surface S based on that information and data. The sensors 92, like sensors 30 above, may detect changes in a measured level of light and/or motion, and send those signals to the processor circuit 82 for analysis.

The grip facilitation circuit 90 in the charging mat 80 also comprises circuitry and hardware controlled by the processor circuit 82 to raise at least part of the hand-held device 10 above the underlying surface S. As described above, the grip facilitation circuit 90 may comprise a coil $C_2$ that generates magnetic field $M_2$ caused by an electrical current that runs through the coil $C_2$. The current may be enabled and disabled by the processor circuit 82 based on the results of a comparison of the signals received from the sensors 92 to the data in the profiles 88 stored in memory 84. If the electronic signature generated by processor circuit 82 from the received signals matches a reference signature stored in at least one of the profiles 88, either entirely or partially to within a predetermined threshold, processor circuit 82 will generate the magnetic field $M_2$ by causing an electrical current to be sent through the coil $C_2$. Additionally, the processor circuit 82 may send a message to the hand-held device 10 to control that device to send an electrical current through its coil $C_1$, thereby generating magnetic field $M_1$, or receive a signal from hand-held device 10 causing the processor circuit 82 to generate magnetic field $M_2$.

The stabilizer 100, as above, also helps to reduce or substantially eliminate any unwanted movement of the hand-held device 10 relative to the underlying surface S without hindering the vertical movement of all or part of the hand-held device 10. To accomplish this stabilization function, the stabilizer 100 may comprise one or more electromagnets and/or permanent magnets that generate stabilizing magnetic fields, as previously described.

Figure 9:
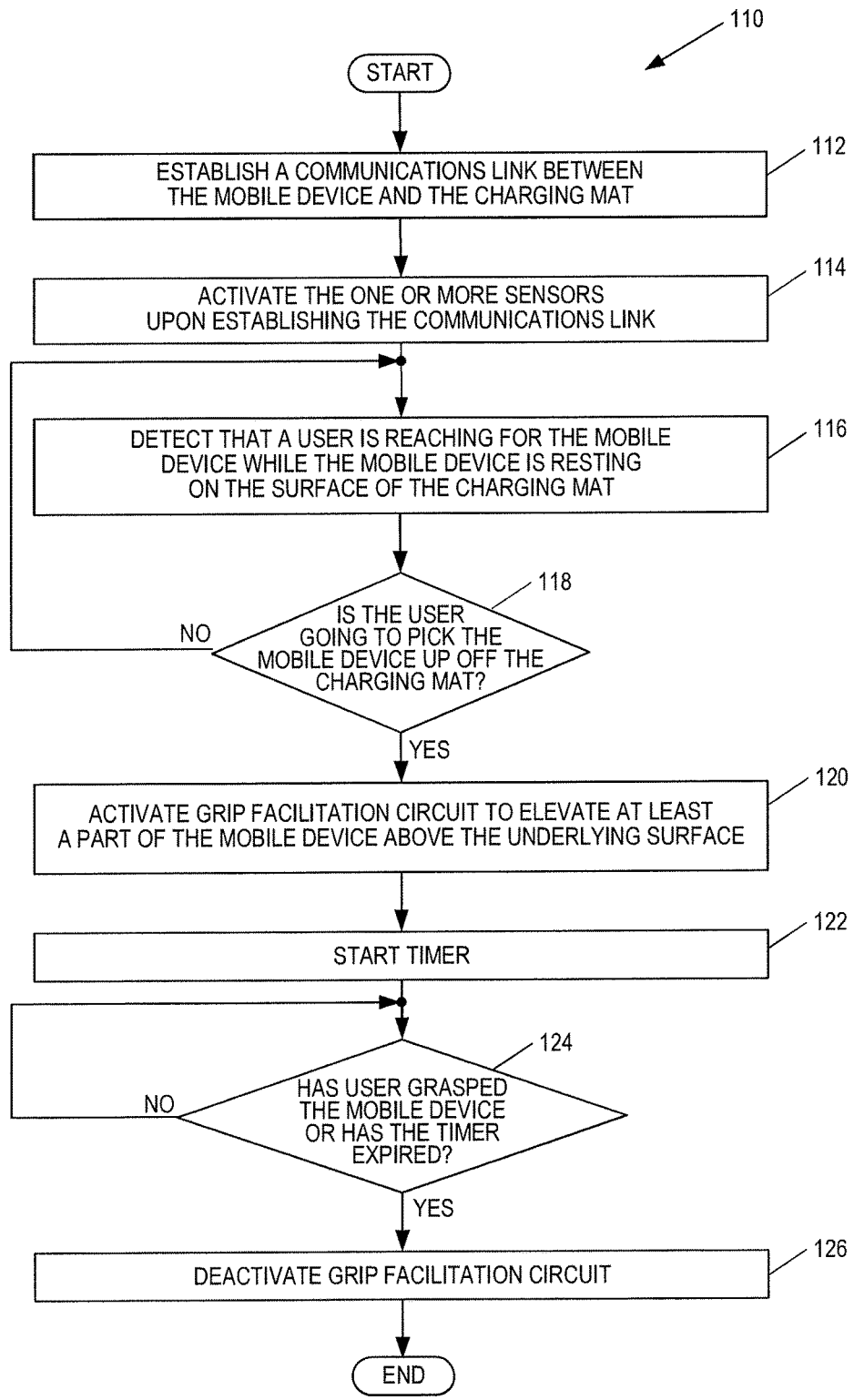
FIG. 9 is a flow diagram illustrating a method for elevating at least a part of a hand-held device above the surface of a peripheral device, such as a charging mat, according to one embodiment of the present disclosure.

FIG. 9 is a flow diagram illustrating a method 110 for elevating at least a part of the hand-held device 10 according to one embodiment. In this embodiment, the hand-held device 10 is resting on the surface of charging mat 80. Further, method 110 is described as if it were implemented at and performed by the hand-held device 10. However, those of ordinary skill in the art should understand that this is for ease of discussion only. Method 110 may be implemented and performed entirely at the charging mat 80, or in some embodiments, at both the hand-held device 10 and the charging mat 80.

Method 110 begins with establishing a communications link between the hand-held device 10 and the charging mat 80 (box 112). By way of example only, the link may be established between the short-range transceivers 28, 98 using the BLUETOOTH protocol. Once the link has been established, the processor circuit 12 of hand-held device 10 may activate the sensors 22 (box 114) to detect when the user is reaching for the hand-held device 10 (box 116). Although not required, the processor circuit 12 in some embodiments of the present disclosure may send one or more control signals to the charging mat 80 that activate sensors 92 to perform the same or similar detection functions. Such embodiments are useful, for example, in cases where the hand-held device 10 is not equipped with sensing capabilities, or where the battery resource of the hand-held device 10 is low.

As previously stated, the sensors 22 generate signals to processor circuit 12 to indicate when the user's hand is approaching the hand-held device 10. Upon receiving those signals, processor circuit 12 will determine whether the user will imminently grasp the hand-held device 10 (box 118). If it is determined that the user's hand is not reaching for the hand-held device 10, the method 110 returns to waiting for the sensors 22 to detect such movement of the user's hand. Otherwise, processor circuit 12 activates the grip facilitation circuit to elevate at least a part of the hand-held device 10 above the underlying surface S (box 120).

As stated above, it is expected that changing the vertical position of the hand-held device 10 relative to the underlying surface S will draw on precious power resources. While this may not be an issue for the charging mat 80, as it is connected to an external power source, it could be problematic for the hand-held device 10, which in most cases has only a rechargeable battery. Therefore, in one embodiment, the present disclosure is configured to activate one or both of the grip facilitation circuits 20, 90 (box 120) to elevate all or a part of the hand-held device 10 above the underlying surface S, and also start an internal timer (box 122) to limit the amount of time the grip facilitation circuit 20 is activated (e.g., <1 second).

By way of example, processors 12, 82 may drive respective currents through their corresponding coils $C_1$, $C_2$, thereby generating their respective magnetic fields $M_1$, $M_2$, as described previously with respect to FIG. 7. While the grip facilitation circuits 20, 90 are activated, the processor circuit 12 performs checks to determine whether the internal timer has expired, or based on an indication from the touch-sensitive sensors 22, whether the user has grasped the hand-held device 10 (block 124). Once the timer expires, or the processor circuit 12 determines that the user has grasped the hand-held device 10, the processor circuit 12 (and/or the processor circuit 82) will deactivate one or both of the grip facilitation circuits 20, 90 (box 126) by ceasing the electrical current flow through one or both of the coils $C_1$, $C_2$, thereby collapsing the corresponding magnetic fields $M_1$, $M_2$.

It should be noted that some embodiments of the present disclosure do not require the use of a timer to control the activation/deactivation of the grip facilitation circuits 20, 90. Rather, in one embodiment, the hand-held device 10 utilizes the signals returned from the plurality of touch-sensitive sensors distributed across its housing. Particularly, when the user grasps the hand-held device 10, the touch-sensitive sensors signal processor 12, which then deactivates the grip facilitation circuit 20 in response. In addition, the hand-held device 10 in these cases may also send a message to the charging mat 80 via the short-range transceivers 28, 98 to deactivate grip facilitation circuits 20 and/or 90.

Further, establishing a communications link between the hand-held device 10 and the charging mat 80 is only required for embodiments in which the charging mat 80 assists the hand-held device 10 in elevating itself above the underlying surface S. In embodiments where the hand-held device performs these functions autonomously, no communications link is required.

Figure 10:
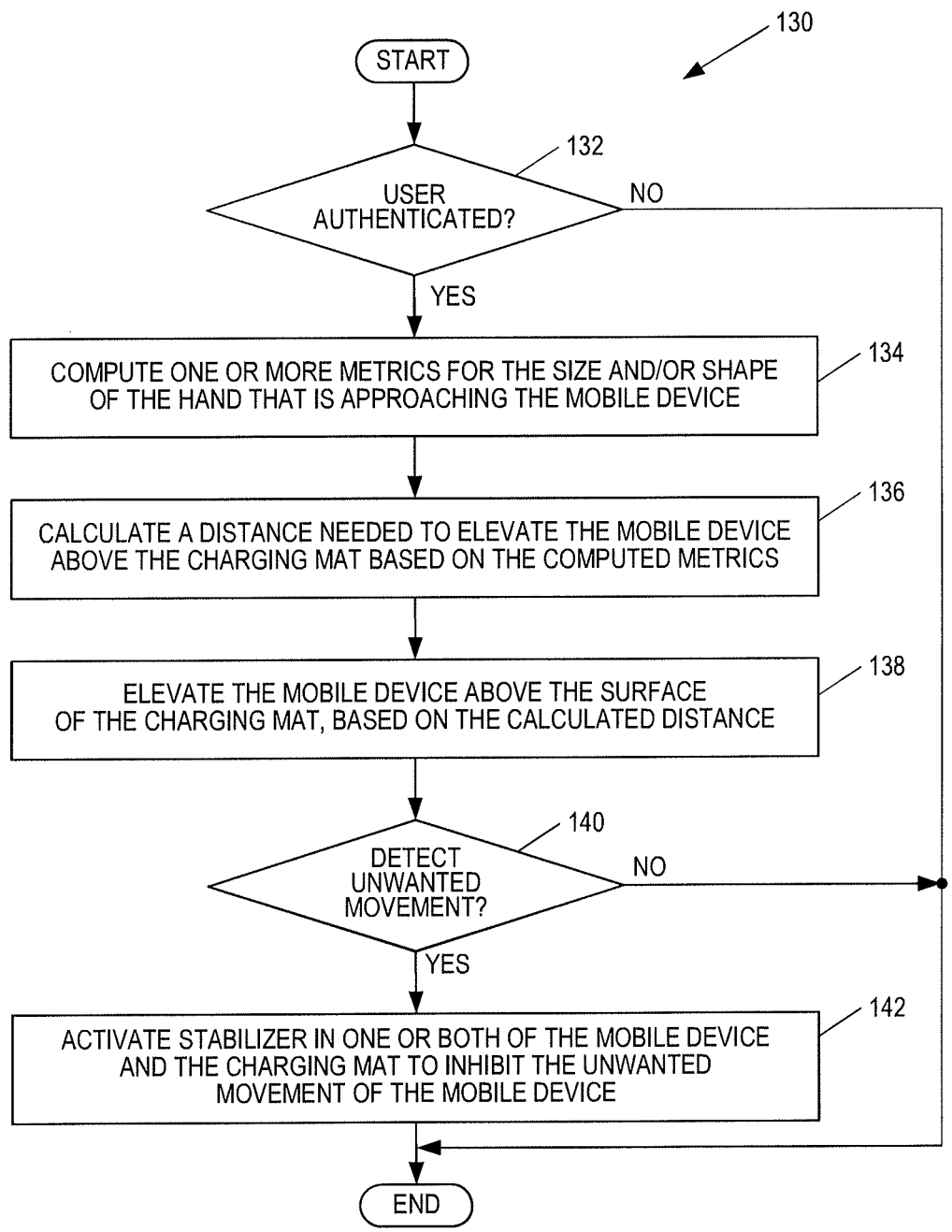
FIG. 10 is a flow diagram illustrating a method for elevating at least a part of a hand-held device above the surface of a peripheral device, such as a charging mat, according to another embodiment of the present disclosure.

Hereinbefore, embodiments of hand-held device 10 are described which utilize the data points of a pick-up signature to determine whether a user is about to grasp the hand-held device 10. However, as seen in FIG. 10, the present disclosure is not so limited. In some embodiments, the hand-held device 10 can also analyze the data points that comprise the pick-up signature to determine other information, such as the size and shape of the user's hand. Particularly, by analyzing the data points using well-known techniques, processor circuit 12 can compute a general size for the user's hand, as well as whether the user's hand is open or closed, for example. Processor circuit 12 can then utilize that information to determine a particular distance d to raise the hand-held device 10 above the underlying surface S.

By way of example, it may be more beneficial for the distance d to be larger if the user has larger hands, and thus, easier for such a user to grasp the hand-held device 10. Users with smaller hands, however, may not require a larger distance d. Thus, by determining information about the size and/or shape of the user's hand, embodiments of the present disclosure can control the amount of current that is used to generate the magnetic fields $M_1$, $M_2$. This may help to preserve battery resources at the hand-held device 10.

FIG. 10 is a flow diagram illustrating a method 130 for elevating at least a part of the hand-held device 10 vertically above an underlying surface S according to these aspects. In FIG. 10, method 130 has already detected that a user is reaching for the hand-held device 10 as it rests on the underlying surface S.

Method 130 begins with the hand-held device 10 authenticating the user (box 132). This may be accomplished, for example, by controlling the sensors 22 to capture an image of the face of the user who is reaching for hand-held device 10, and then controlling the processor circuit 12 to perform a facial recognition analysis on the image, as is known in the art. If authentication fails, processor circuit 12 will not activate the grip facilitation circuit 20, thereby making it difficult for the user to grasp the hand-held device 10. A successful authentication, however, will enable the processor circuit 12 to compute one or more metrics related to the size and/or shape of the hand that is approaching the hand-held device 10 (box 134). Based on these metrics, processor 12 calculates a distance d to elevate at least a part of the hand-held device 10 above the underlying surface S (box 136), and then activates the grip facilitation circuit 20, and possibly grip facilitation circuit 90 as previously described, to elevate at least a part of the hand-held device 10 above the underlying surface S by the distance d (box 138).

While the hand-held device 10 is being raised above the underlying surface S, processor circuit 12 may monitor the hand-held device 10 for any unwanted horizontal or rotational movement (box 140). In some embodiments, if such movement is detected, processor circuit 12 may enable stabilizer 30 and/or 100 to prohibit or at least substantially reduce such movement. Additionally, processor circuit 12 may communicate an indication of unwanted movement to processor circuit 82 of charging mat 80 so that it may also activate stabilizer 100, as needed or desired.

As seen in some of the earlier figures, the entirety of hand-held device 10 was elevated above the underlying surface S. While such embodiments may benefit from the use of a stabilizer 30 and/or 100, this additional functionality may use even more of the power resources of hand-held device 10. Therefore, in other embodiments of the present disclosure, only a part of the hand-held device 10 is elevated above the underlying surface S. The remaining part of hand-held device 10 is left in contact with the underlying surface S of the charging mat 80, thereby preventing the previously described unwanted horizontal and/or rotational movement. However, because some part is raised above the underlying surface S by a distance d, these embodiments still make it easier for the user to grasp hand-held device 10.

FIGS. 11A-11C illustrate different embodiments of the present disclosure in which only a part of the hand-held device 10 is raised above the underlying surface S, while the remaining parts remain in contact with the underlying surface S. Particularly, FIG. 11A illustrates an embodiment, wherein a center portion of hand-held device 10 is raised above the underlying surface S while the terminal ends remain in contact with the underlying surface S. FIG. 11B illustrates an embodiment in which only one end of hand-held device 10 is raised above the underlying surface S, while FIG. 11C illustrates an embodiment wherein both ends of hand-held device 10 are raised vertically above the underlying surface S. To accomplish this "partial lift" aspect of the present disclosure, some embodiments place the grip facilitation circuit 20, and, optionally, grip facilitation circuit 90 if the underlying surface S is the surface of a charging mat 80, at selected locations.

Those skilled in the art should appreciate that magnetic fields are not the only way to raise the hand-held device 10 above an underlying surface S of charging mat 80. In some embodiments, seen in FIG. 12A, for example, the grip facilitation circuit 90 of the charging mat 80 comprises a pump that expels a gas G, such as air, through a plurality of gas ports P formed in the underlying surface S. In such cases, the pump would draw air through a relatively large intake port I from the ambient environment and then expel that air through the relatively smaller ports P to temporarily elevate the hand-held device 10 above the underlying surface S.

Generally, table surfaces (e.g., kitchen tables or nightstands) are not equipped with components that generate magnetic fields, such as magnetic field $M_2$. Therefore, in some embodiments, the hand-held device 10 autonomously determines whether a user is reaching for the hand-held device 10, and if so, elevates itself at least partially above the underlying surface S on which it rests.

There are various ways in which the hand-held device 10 may be configured to perform these functions autonomously. As seen in FIG. 12B, for example, one way to accomplish this function is to configure hand-held device 10 with a grip facilitation circuit 90 comprising a plurality of gas ports P, an intake port I, and a pump. As above, the pump or similar component draws air in through the intake port I, and expels the air out through selected gas ports P. The expelled air would be sufficient to raise all or a part of the hand-held device 10 vertically above the underlying surface S by a distance d, which may be calculated as described above.

Those skilled in the art should appreciate that, because the distance d above which the hand-held device 50 must be raised above the underlying surface is small (e.g., a few millimeters), and because the hand-held device 10 need only be raised that distance d for a very short time (e.g., about 1 second or less), the volume of air that needs to be expelled through the gas ports P is also expected to be small.

Figure 13:
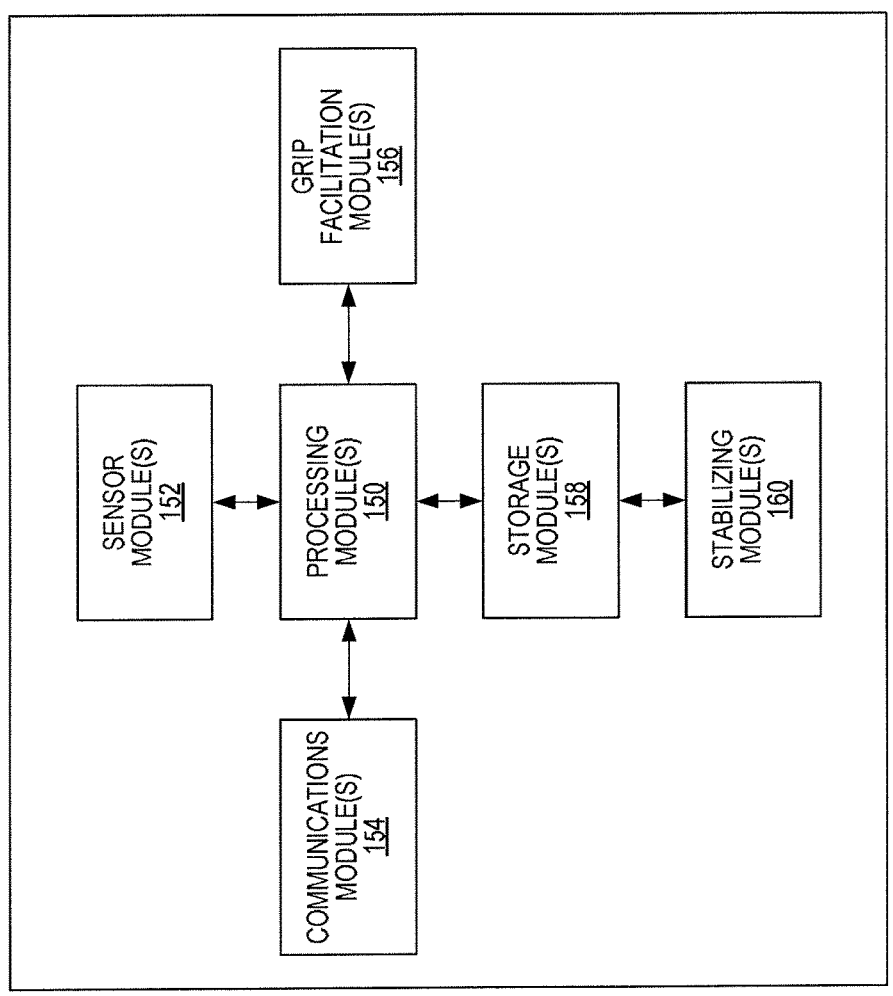
FIG. 13 is a functional module diagram of a device configured according to one embodiment of the present disclosure.

FIG. 13 is a functional block diagram illustrating some functional modules configured according to one embodiment of the present disclosure. Each module 150, 152, 154, 156, 158 and 160 seen in FIG. 13 may be implemented by either the hand-held device 10 or the charging mat 80, or by some other peripheral device, and may comprise dedicated hardware, programmable hardware together with appropriate firmware, or one or more processors together with appropriate computer program modules.

As seen in FIG. 13, the modules comprise a processing module 150, a sensor(s) module 142, a communications module 154, a grip facilitation module 146, a storage module 158, and a stabilizing module 160. The processing module 150, which may or may not comprise memory 14, 84, receives signals from one or both of the sensing module 152 and the communications module 154 indicating whether a user is reaching to grasp the hand-held device 10, and in response, generates control signals to control the grip facilitation module 154 to raise at least a part of the hand-held device 10 vertically above an underlying surface S.

The sensing module 152 is operative to detect whether a user's hand is reaching for the hand-held device 10, as previously described, and to report such detection to the processing module 150 via signaling. Thus, in at least one embodiment, the sensing module 152 performs the functions described previously with respect to the one or more sensors 22 and/or 92.

The communications module 154 is operative to send and receive signals and data to one or more remote parties via a network, as is known in the art, as well as to another device via a short-range communications interface, as previously described. The communications module 154, which is operatively connected to the processing module 150, may communicate with such remote parties using any known communications protocols known in the art. In one embodiment, the communications module 154 comprises, for example, an interface for performing receiver and transmitter functions. In other embodiments, however, the communications module comprises radio transceiver circuitry configured to facilitate communications between the hand-held device 10 and a charging mat 80. Regardless of the embodiment, however, the communications module 154 includes transmitter and receiver functionality that may share circuit components and/or software, or alternatively may be implemented separately as independent components.

The grip facilitation module 156 comprises the hardware and/or software necessary for temporarily altering the vertical position of at least a part of the hand-held device 10 relative to the underlying surface S. As previously described, such functions are controlled by the processing module 150 in response to the sensor module 152 reporting to the processing module 150 that the user is reaching to grasp the hand-held device 10 as the device 10 rests on the underlying surface S. The function of the grip facilitation module 156 is to utilize the functions mentioned above to make it easier for an authorized user to grasp the hand-held device 10.

The storage module 158 comprises memory configured to store the control application and the profiles mentioned above. In operation, the processing module 150 performs the functions mentioned above responsive to the instructions defined in the control application(s) 16 and/or 86. This includes generating the aforementioned "pick-up" signatures and comparing them to the reference signatures stored in profiles 18 and/or 88.

The stabilizer module 160 comprises the components necessary for stabilizing the hand-held device 10 against unwanted horizontal and/or rotational movement. As stated above, the components that comprise the stabilizer module 160 may include one or more electromagnets in combination with one or more permanent magnets, for example, or any other hardware and/or software components that prevent such unwanted movement of device 10. However, while the stabilizer module 160 is not required for all embodiments, it does not interfere with the vertical raising of the hand-held device 10 above the underlying surface, as previously described.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for enabling a user to grasp a hand-held device positioned on an underlying surface, the method comprising:
   detecting that a user is reaching for the hand-held device while the hand-held device is resting on the underlying surface, wherein detecting comprises:
      generating a pick-up signature based on signals received from one or more sensors indicating that the user's hand is approaching the hand-held device; and
      comparing the pick-up signature to a predefined reference signature comprising information representing the user's hand approaching the hand-held device; and
   responsive to the detecting, altering at least one of a shape of the hand-held device, and a vertical position of the hand-held device relative to the underlying surface, to facilitate the user grasping the hand-held device.

2. The method of claim 1 wherein the underlying surface comprises a surface of a peripheral device associated with the mobile device.

3. The method of claim 2 further comprising activating a grip facilitation circuit in one or both of the hand-held device and the peripheral device responsive to receiving a signal indicating that the user is reaching for the hand-held device, wherein the grip facilitation circuit is configured to alter one or both of the shape and the vertical position of the hand-held device.

4. The method of claim 3 wherein activating the grip facilitation circuit comprises controlling one of the hand-held device and the peripheral device to extend a protrusion that elevates at least a portion of the hand-held device vertically above the underlying surface.

5. The method of claim 3 wherein activating the grip facilitation circuit comprises generating a magnetic field (M) that elevates at least a portion of the hand-held device vertically above the underlying surface.

6. The method of claim 3 wherein activating the grip facilitation circuit comprises expelling a gas (G) to elevate at least a portion of the hand-held device vertically above the underlying surface.

7. The method of claim 3 wherein activating the grip facilitation circuit comprises altering the shape of the hand-held device such that at least a portion of the hand-held device is elevated above the underlying surface.

8. The method of claim 7 wherein controlling the hand-held device to alter its shape comprises deforming the hand-held device such that the portion of the hand-held device is above the underlying surface while one or both opposing ends of the hand-held device remain in contact with the underlying surface.

9. The method of claim 7 wherein controlling the hand-held device to alter its shape comprises increasing a volume of the portion of the hand-held device such that a part of the hand-held device is elevated above the underlying surface.

10. The method of claim 3 further comprising deactivating (94) the grip facilitation circuit responsive to a termination event comprising at least one of:
   detecting that the user has grasped the hand-held device;
   detecting that a predetermined timer has expired without the user grasping the hand-held device; and
   detecting that the hand-held device and the peripheral device are no longer paired.

11. The method of claim 2 wherein the peripheral device comprises a charging mat.

12. The method of claim 1 further comprising determining that the user is reaching for the hand-held device if the pick-up signature matches at least one of the reference signatures.

13. The method of claim 1 further comprising:
   calculating a distance between the user's hand and the hand-held device as the user's hand approaches the hand-held device; and determining that the user is reaching for the hand-held device when the calculated distance is less than or equal to a predetermined distance threshold.

14. The method of claim 1 further comprising activating a stabilizer configured to stabilize movement of the hand-held device while the vertical position of the hand-held device is changing.

15. The method of claim 1 further comprising:
authenticating the user responsive to detecting that the user is reaching for the hand-held device resting on the underlying surface; and
altering one or both of the shape and the vertical position of the hand-held device if the user is authenticated.

16. The method of claim 1 further comprising:
determining a metric corresponding to one or both of a size and a shape of the user's hand responsive to detecting that the user is reaching for the hand-held device;
calculating a distance to elevate the hand-held device above the underlying surface based on the determined metric;
altering the one or both of the shape and the vertical position of the hand-held device according to the calculated distance.

17. An apparatus for facilitating a user grasping a hand-held device, the apparatus comprising:
one or more sensors configured to detect a user's hand reaching for a hand-held device while the hand-held device is resting on an underlying surface;
a grip facilitation circuit configured to alter at least one of a shape of the hand-held device, and a vertical position of the hand-held device relative to the underlying surface to enable the user to grasp the hand-held device; and
a processor communicatively connected to the one or more sensors and the grip facilitation circuit, the processor configured to:
generate a pick-up signature based on signals received from the one or more sensors indicating that the user's hand is approaching the hand-held device;
compare the pick-up signature to a predefined reference signature comprising information representing the user's hand approaching the hand-held device;
determine that the user is reaching for the hand-held device if the pick-up signature matches at least one of the reference signatures to within a predetermined threshold; and
activate the grip facilitation circuit responsive to determining that the user is reaching for the hand-held device.

18. The apparatus of claim 17 wherein the apparatus comprises the hand-held device.

19. The apparatus of claim 17 wherein the apparatus comprises a peripheral device associated with the hand-held device.

20. The apparatus of claim 19 wherein the processor is further configured to deactivate the grip facilitation circuit responsive to detecting that:
the user has grasped the hand-held device; or
a predetermined timer has expired without the user grasping the hand-held device; or
the hand-held device and the peripheral device are no longer communicating with each other.

21. The apparatus of claim 17 wherein the processor is further configured to:

calculate a distance between the user's hand and the hand-held device as the user's hand approaches the hand-held device; and
determine that the user is reaching for the hand-held device when the calculated distance is less than or equal to a predetermined distance threshold.

22. The apparatus of claim 17 wherein the grip facilitation circuit comprises a retractable member (F), and wherein the processor is further configured to control the grip facilitation circuit to extend the retractable member to elevate at least a portion of the hand-held device vertically above the underlying surface.

23. The apparatus of claim 17 wherein the processor is further configured to control the grip facilitation circuit to generate a magnetic field (M) that elevates at least a portion of the hand-held device vertically above the underlying surface.

24. The apparatus of claim 17 wherein the processor is further configured to control the grip facilitation circuit to expel a gas (G) that elevates at least a portion of the hand-held device vertically above the underlying surface.

25. The apparatus of claim 17 wherein the processor is further configured to control the grip facilitation circuit to alter the shape of the hand-held device such that at least a portion of the hand-held device is elevated vertically above the underlying surface.

26. The apparatus of claim 25 wherein the processor is further configured to control the grip facilitation circuit to deform the hand-held device such that the portion of the hand-held device is above the underlying surface while one or both opposing ends of the hand-held device remain in contact with the underlying surface.

27. The apparatus of claim 25 wherein the processor is further configured to control the grip facilitation circuit to increase a volume of the portion of the hand-held device such that a part of the hand-held device is above the underlying surface.

28. The apparatus of claim 17 further comprising a stabilizer configured to stabilize movement of the hand-held device while the vertical position of the hand-held device is changing.

29. The apparatus of claim 17 wherein the processor is further configured to:
authenticate the user responsive to detecting that the user is reaching for the hand-held device resting on the underlying surface; and
alter one or both of the shape and the vertical position of the hand-held device if the user is authenticated.

30. The apparatus of claim 17 wherein the processor is further configured to:
determine a metric corresponding to one or both of a size and a shape of the user's hand based on one or more signals received from the proximity detector;
calculate a distance to elevate the hand-held device above the underlying surface based on the determined metric; and
alter the one or both of the shape and the vertical position of the hand-held device according to the calculated distance.

31. A non-transitory computer-readable storage medium comprising a control application stored thereon that, when executed by a processor, controls the processor to:
detect that a user is reaching for a hand-held device while the hand-held device is resting on an underlying surface, wherein detecting comprises:

generate a pick-up signature based on signals received from one or more sensors indicating that the user's hand is approaching the hand-held device; and compare the pick-up signature to a predefined reference signature comprising information representing the user's hand approaching the hand-held device; and responsive to the detecting, elevate at least a part of the hand-held device above the underlying surface to enable the user to grasp the hand-held device.

32. A method for enabling a user to grasp a hand-held device positioned on an underlying surface, the method comprising:

detecting that a user is reaching for the hand-held device while the hand-held device is resting on the underlying surface, wherein detecting comprises:

generating a pick-up signature based on signals received from one or more sensors indicating that the user's hand is approaching the hand-held device; and comparing the pick-up signature to a predefined reference signature comprising information representing the user's hand approaching the hand-held device; and responsive to the detecting, elevating at least a part of the hand-held device above the underlying surface to enable the user to grasp the hand-held device.

33. The method of claim 32 wherein the method is performed by the hand-held device.

34. The method of claim 32 wherein the underlying surface comprises a surface of a peripheral device associated with the mobile device, and wherein the method is performed by the peripheral device.

* * * * *